Oct. 10, 1961 W. G. KOLANDER Re. 25,051

METHOD OF FORMING A FROZEN CONFECTION

Original Filed Aug. 22, 1957

INVENTOR.
WILLIAM G. KOLANDER,
BY
ATTORNEY.

United States Patent Office

Re. 25,051
Reissued Oct. 10, 1961

25,051

METHOD OF FORMING A FROZEN CONFECTION

William G. Kolander, 354 E St., Chula Vista, Calif.

Original No. 2,927,544, dated Mar. 8, 1960, Ser. No. 679,659, Aug. 22, 1957. Application of reissue Mar. 14, 1961, Ser. No. 95,762

8 Claims. (Cl. 107—54)

Matter enclosed in heavy brackets [ ] appears in the original patent but forms no part of this reissue specification; matter printed in italics indicates the additions made by reissue.

This invention relates to a method of forming a frozen confection, and *more* particularly *to* an ice cream preparation which is placed either within a cone or on a stick and is served in this manner and eaten directly from the cone or on the stick.

An object of my invention is to provide a novel method of forming a frozen confection in which the ice cream or iced preparation is placed in a [pastry bag] *container* and is extruded from the [bag] container by hand or by a machine onto and around a dispensing stick, or into a cone as might be desired.

Another object of the present invention is to provide a novel method of forming a frozen confection of the character stated, in which the ice cream retains its flavor and texture more effectively than if the confection is left in a machine and continuously agitated by the machine and, further, that the confection can be dispensed more quickly, easily and effectively than by methods heretofore in use, particularly by means of a spoon or other dispenser.

Another object of the present invention is to provide a novel method of forming a frozen confection in which the confection is placed directly onto a stick or other dispensing object, the confection being extruded from a [flexible pastry bag] *container,* and the confection requires no additional freezing or forming other than the form which is imparted to it by the extruding step from the [pastry bag] *container.*

Other objects, advantages and features of the invention may appear from the accompanying drawing, the subjoined detailed description and the appended claims.

In the drawing:

FIGURE 2 is a fragmentary side elevation of a pastry bag and *a* dispensing stick showing the second step of forming the frozen confection.

Figure 1:
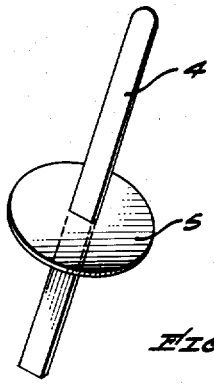
FIGURE 1 is a perspective view of a dispensing stick.
Figure 2:
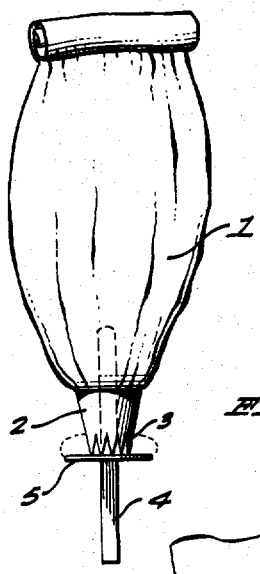
FIGURE 2 is a side elevation of a pastry bag in the first position of extruding a confection onto the stick.

Referring more particularly to the drawing, ice cream as it comes from the freezer is considered to be in a soft state, that is, it is semi-frozen [,]. [it] *It* is pliable and, therefore, extrudable from a pastry bag, sack, or other container. The ice cream as it comes from a freezer is at a temperature of about 25° F. When the temperature is reduced to about 15° F. the ice cream or confection will be hard. Therefore, the ice cream or confection as it comes from the freezer is *usually* placed in a pastry bag of a large commercial size and is kept in a refrigerator at a temperature of from 20° F. to 25° F. so that the confection will be extrudable since it is [semi-frozen] *plastically frozen rather than hard frozen* at this temperature [, and also it]. *When kept at this temperature, the confection* will not spoil or melt but will retain its flavor and texture without the necessity of further agitation in a machine, which is the present practice where ice cream is stored at these temperatures. If the temperature of the ice cream is lowered to about 15° F. then it will be hard *frozen* and requires a spoon or other dispenser in order to place portions of the ice cream in a cone or on a stick.

[The ice cream, therefore,] *In the illustrated embodiment, the ice cream* is first placed in a pastry bag 1, and this bag is of the large commercial type and is preferably formed of some flexible material, such as canvas. A metal tip 2, is mounted at the lower open end of the bag 1, and this tip is formed with peripheral teeth 3 which produce small furrows or grooves in the outer surface of the ice cream and will give a surface pattern to the completed eatable confection, and will tend to provide a more even conical contour to the confection. *Although the illustrated embodiment utilizes a flexible container which is squeezed to cause extrusion of its contents, such a container is shown for ease and clarity of description only and it is readily apparent that other types of container arrangements from which the contents can be extruded are also suitable.*

Figure 3:
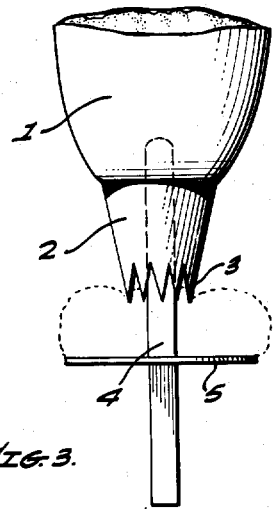
Figure 4:
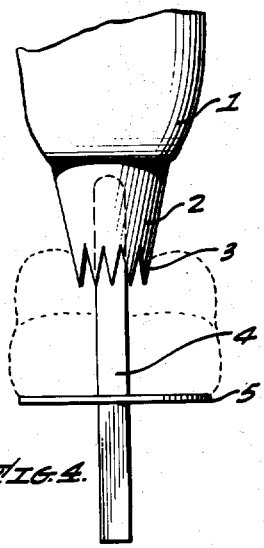
FIGURE 4 is a view similar to FIGURE 3 and showing still another step in the method of forming the frozen confection.
Figure 5:
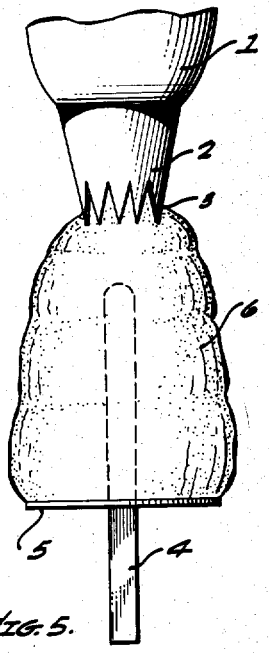
FIGURE 5 is a view similar to FIGS. 2, 3, and 4 and showing the final step in forming the frozen confection.

A stick 4, which may be either of wood, paper, plastic or the like, is provided with a platform 5 thereon which receives and supports the iced or frozen confection as illustrated. Heretofore, it was always necessary, after placing the confection on the stick, to reduce the temperature of the confection to a point where it became sufficiently solid and this required a separate mold and also a separate freezing step, all of which required time and additional equipment. In my method the ice cream, in a [semi-frozen] *plastically frozen* or pliable condition, is placed in the *extruding container or* pastry bag 1. When a cone or other confection is to be produced the stick 4 is inserted into the bottom of the bag 1 through the tip 2, and with the tip either resting on or slightly spaced above the platform 5. Pressure is now exerted on the bag 1 and the frozen confection is extruded from the tip 2 and flows downwardly and outwardly on to the platform 5. The bag 1 is now raised step by step, as shown in FIGS. 3, 4, and 5, and at each step an additional height of the confection is added while the completed cone 6 is formed. Since the ice cream flows out through the teeth 3 it will form vertical furrows or grooves in the outer surface of the confection 6, which more effectively forms that confection and also gives a more satisfactory and pleasing appearance to the finished product. When the confection 6 has been raised to the desired height, pressure on the bag 1 is released and the completed confection is dispensed immediately to the purchaser.

Figure 6:
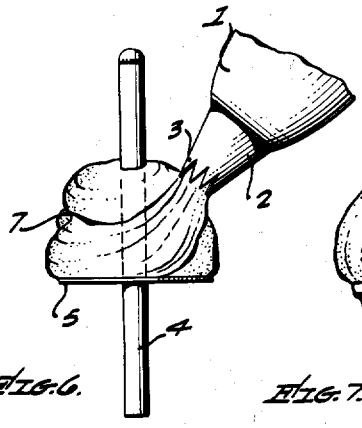
FIGURE 6 is a side elevation illustrating a slightly modified method of forming the frozen confection.

In FIG. 6 I have shown a modified method of forming a confection on the platform 5, and in this method the tip 2 of the pastry bag 1 is placed on the outside of the stick 4, and when pressure is applied to the bag to extrude the ice cream the bag or the stick 4 will be revolved, thus building up a spiral or circular stack or confection of ice cream on the platform 5. The bag 1 is again moved upwardly relative to the platform 5 to impart the required height to the completed confection 7 in substantially the same manner as previously described.

Figure 7:
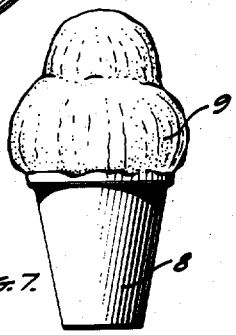
FIGURE 7 is a side elevation of the frozen confection in a cone.

In FIG. 7 an eatable confection cup 8 is shown and the completed frozen confection 9 is extruded into the confection cup from the pastry bag 1, and again the relative movement between the bag and the confection cup supporting the ice cream is provided so that a mound or cone of ice cream is formed.

[Having described my invention, I claim:] *Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.*

*What is claimed is:*

1. The method of forming a frozen confection consisting of first placing frozen ice cream in a flexible pastry bag having an outlet spout at the bottom end thereof, then placing the outlet spout above a platform to receive the frozen confection, then exerting pressure on the pastry bag and the ice cream therein to extrude the ice cream onto the platform, then moving the pastry bag relative to the platform to create a mount of ice cream on said platform, said platform consisting of a disc, said disc being mounted on a stick, and the mount of ice cream resting on said platform and also surrounding the stick rising therefrom, said stick being inserted into the outlet spout during extrusion of the frozen confection from the spout, said mound of ice cream being formed without external support to the sides of the mound.

2. The method of forming a frozen confection consisting of first placing frozen ice cream in a flexible pastry bag having an outlet spout at the bottom end thereof, then placing the outlet spout above a platform to receive the frozen confection, then exerting pressure on the pastry bag and the ice cream therein to extrude the ice cream onto the platform, then moving the pastry bag relative to the platform to create a mound of ice cream on said platform, said platform consisting of a disc, said disc being mounted on a stick, said stick protruding into the outlet spout in one position of the platform and the spout, said pastry bag and outlet spout being moved longitudinally of the stick as the ice cream is extruded from the outlet spout, the mound of ice cream surrounding the stick and being supported on the platform, said mound of ice cream being formed without external support to the sides of said mound.

3. The method of forming a frozen confection consisting of first placing frozen ice cream in a flexible pastry bag having an outlet spout at the bottom end thereof, said frozen ice cream being at a temperature of 20° F. to 25° F., then placing the outlet spout above a platform to receive the frozen confection, then exerting pressure on the pastry bag and the ice cream therein to extrude the ice cream onto the platform, then moving the pastry bag relative to the platform to create a mound of ice cream on said platform, said platform consisting of a disc, a stick extending through the disc, the mound of ice cream resting on the disc and surrounding said stick, said stick being inserted into the outlet spout during extrusion of the frozen confection from the spout, said mound of ice cream being formed without external support to the sides of the mound.

4. The method of forming a frozen confection consisting of first placing frozen ice cream in a flexible pastry bag having an outlet spout at the bottom end thereof, said frozen ice cream being at a temperature of 20° F. to 25° F., then placing the outlet spout above a platform to receive the frozen confection, then exerting pressure on the pastry bag and the ice cream therein to extrude the ice cream onto the platform, then moving the pastry bag relative to the platform to create a mound of ice cream on said platform, said platform consisting of a disc, a stick extending through the disc, the mound of ice cream resting on the disc and surrounding said stick, said stick extending into the outlet spout in one position of the platform and spout, said stick being gradually withdrawn from the outlet spout as the mound of ice cream is created, said mound of ice cream being formed without external support to the sides of said mound.

*5. The method of forming a plastically frozen confection comprising the steps of: placing a plastically frozen confection into a container having an outlet spout at the bottom thereof; placing a confection carrier under the spout of said container, said confection carrier consisting of a platform through which extends a stick, the confection carrier being so disposed relative to the spout that one end of said stick extends into said spout; and applying pressure to the confection within said container to extrude the confection from said spout onto said platform, said platform being moved relative to said spout during extrusion of the confection to thereby form a mound of confection on said platform without external support to the sides of the mound.*

*6. The method of forming a plastically frozen confection comprising the steps of: placing a plastically frozen confection into a container having an outlet spout at the bottom thereof; placing a confection carrier under the spout of said container, said confection carrier consisting of a platform through which extends a stick, the confection carrier being so disposed relative to the spout that one end of said stick extends into said spout; and applying pressure to the confection within said container to extrude the confection from said spout onto said platform, said platform being moved away from said spout during extrusion of the confection to gradually withdraw said stick from said spout while forming a mound of confection around said stick and supported by said platform without external support to the sides of the mound.*

*7. The method of forming a frozen confection comprising the steps of: placing plastically frozen ice cream into a container having an outlet spout at the bottom end thereof, said ice cream being at a temperature of from 20° to 25° F.; placing a confection carrier under the spout of said container, said confection carrier consisting of a platform through which extends a stick, the confection carrier being so disposed relative to the spout that one end of said stick extends into said spout; and applying pressure to the ice cream within said container to extrude the ice cream from said spout onto said platform, said platform being moved relative to said spout during extrusion of the ice cream to thereby form a mound of ice cream on said platform without external support to the sides of the mound.*

*8. The method of forming a plastically frozen confection comprising the steps of: placing a plastically frozen confection into a flexible container having an outlet spout at the bottom end thereof; placing a confection carrier under the spout of said container, said confection carrier consisting of a platform through which extends a stick, the confection carrier being so disposed relative to the spout that one end of said stick extends into said spout; and applying inwardly directed pressure to the walls of said container and the confection therein to extrude the confection from said spout onto said platform, said platform being moved relative to said spout during extrusion of the confection to thereby form a mound of confection on said platform without external support of the sides of the mound.*

References Cited in the file of this patent or the original patent

UNITED STATES PATENTS

| | | |
|---|---|---|
| 1,397,510 | Grassi | Nov. 22, 1921 |
| 1,526,782 | Fleischer | Feb. 17, 1925 |
| 1,711,599 | Harper | May 7, 1929 |
| 2,057,297 | Fatland | Oct. 13, 1936 |
| 2,629,346 | Johansen | Feb. 24, 1953 |